United States Patent [19]

Nguyen

[11] Patent Number: 5,180,004
[45] Date of Patent: Jan. 19, 1993

[54] INTEGRAL HEATER-EVAPORATOR CORE

[75] Inventor: Hung P. Nguyen, Williamsville, N.Y.

[73] Assignee: General Motors Corporation, Detroit, Mich.

[21] Appl. No.: 901,473

[22] Filed: Jun. 19, 1992

[51] Int. Cl.⁵ .......................... F28D 1/03; F28F 3/08
[52] U.S. Cl. .................... 165/140; 165/135; 165/153
[58] Field of Search .............. 165/140, 152, 153, 135

[56] References Cited

U.S. PATENT DOCUMENTS

| | | | |
|---|---|---|---|
| 1,870,457 | 8/1932 | Kenney | 165/140 |
| 3,315,731 | 4/1967 | Jensen et al. | 165/140 |
| 4,002,201 | 1/1977 | Donaldson | 165/140 |
| 4,327,802 | 5/1982 | Beldam | 165/153 |
| 4,651,816 | 3/1987 | Struss et al. | 165/140 |
| 4,800,954 | 1/1989 | Noguchi et al. | 165/153 |
| 4,860,823 | 8/1989 | Noguchi | 165/153 |
| 4,915,165 | 4/1990 | Dahlgren et al. | 165/166 |
| 4,923,001 | 5/1990 | Marcolin | 165/140 |
| 5,000,257 | 3/1991 | Shinmura | 165/140 |
| 5,033,540 | 7/1991 | Tategami et al. | 165/140 |
| 5,042,577 | 8/1991 | Suzumura | 165/153 |

FOREIGN PATENT DOCUMENTS

| | | | |
|---|---|---|---|
| 108394 | 6/1983 | Japan | 165/135 |
| 293086 | 12/1987 | Japan | 165/140 |

Primary Examiner—John Rivell
Assistant Examiner—L. R. Leo
Attorney, Agent, or Firm—Patrick M. Griffin

[57] ABSTRACT

A unitized heater and evaporator core for an HVAC system of a vehicle comprises a plurality of pairs of stacked plates joined together to form separate and discrete tube passes for the heater and the evaporator for the air conditioning system with tanks provided at opposite ends thereof. Each tube includes an internal partition wall for separating heater and evaporator fluids in isolated sections of the tubes. Air centers are connected between adjacent pairs of plates for directing an inlet air stream through the combined evaporator and heater core. Tabs extending from the partition wall formed by the plates of the tubes provide support for separating the air center fins to be connected to the heater and evaporator sections of the tube of the core to inhibit the conduction of heat energy therebetween.

3 Claims, 4 Drawing Sheets

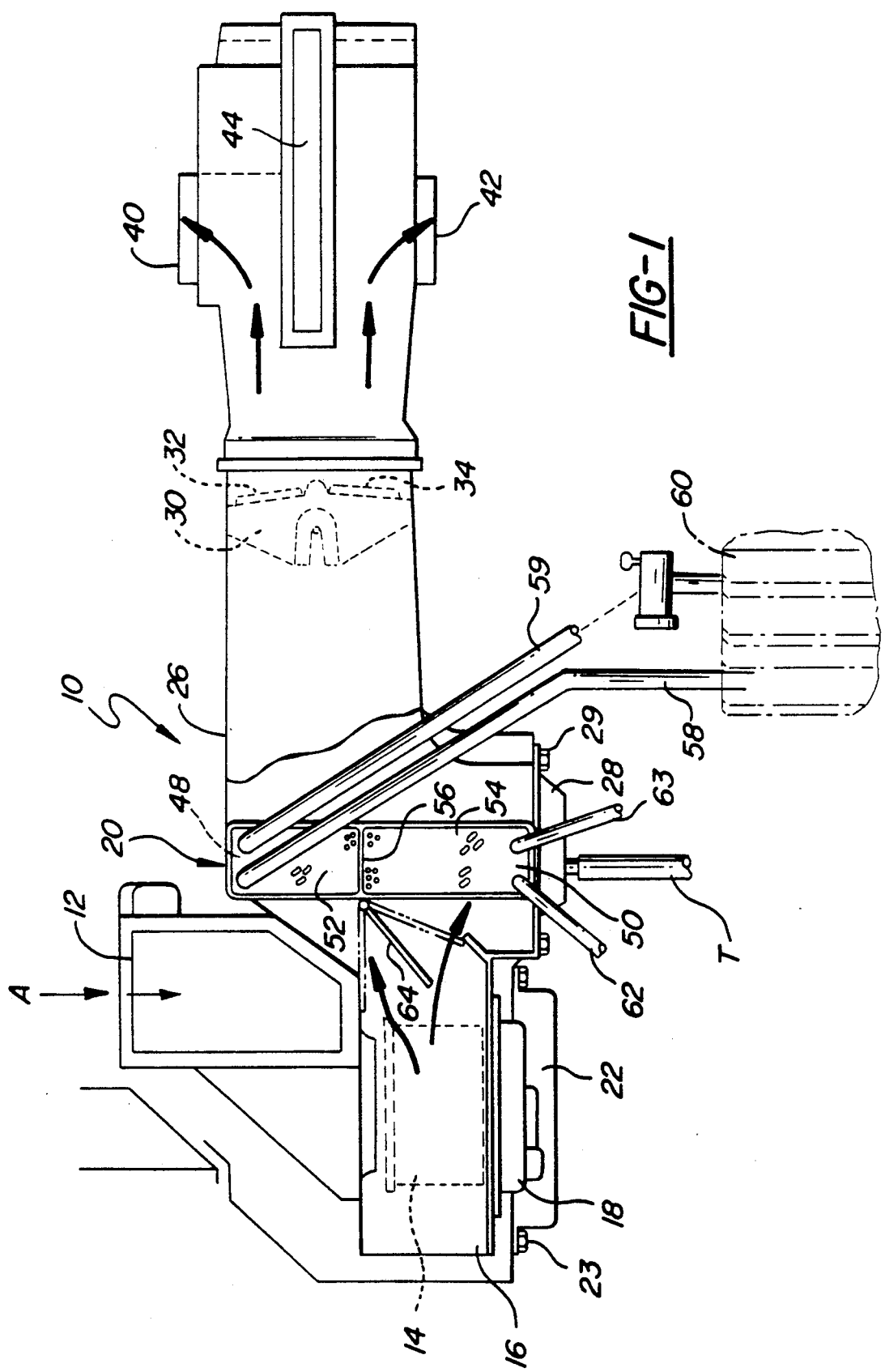

INTEGRAL HEATER-EVAPORATOR CORE

TECHNICAL FIELD

The invention relates to heat exchangers of the parallel tube and fin type, and more particularly to unitized heater and evaporator cores having integral tubes providing discrete sections for engine coolant and for air conditioner refrigerant formed by layered laminated plates.

BACKGROUND OF THE INVENTION

Heating, ventilation and air conditioning (HVAC) systems are employed to control the air flow and temperature in the occupant's compartment of a motor vehicle. In a typical system, a heater core is operatively connected to the radiator of an internal combustion engine and an air conditioning evaporator core is operatively connected to the condenser and other components of the air conditioning system. Generally, the heater and evaporator cores are separate heat exchanger units and are located at spaced locations in a modular housing for the HVAC system so the temperature of air entering into the passenger compartment can be readily changed by varying the distribution of air flow through the heater and evaporator cores by adjusting the position of air flow control baffles and doors fitted inside the modular housing. While such systems are highly effective and operate with good efficiency, they require considerable space and large modular housings that are mounted in crowded compartments such as that for the vehicle engine. Since such cores are completely separate from one another, more material, labor effort, and space is required, and overall vehicle weight is increased.

In the HVAC system, the evaporator cools, dries and cleans the air that enters the passenger compartment. In operation, a refrigerant enters the evaporator as a low pressure mixture of liquid and vapor. The liquid vaporizes at the low pressure, absorbing large quantities of heat from the passing air. As the heat is transferred through the walls of the evaporator from the air passing over it, moisture in the air condenses on the surface and is drained off, carrying foreign materials such as dust and pollen.

The engine coolant system includes a closed system for coolant flow. The prime function of the engine cooling system is to dissipate heat generated by the combustion of fuels in the combustion chambers of the engine to maintain engine temperature at a specified level under anticipated operating conditions. Usually there are two heat exchangers in the cooling system of a vehicle: (1) a radiator for dissipating excessive heat energy generated by engine operation, and (2) a heater to transfer heat energy to air delivered to the passenger compartment.

In vehicle HVAC systems, separate evaporator and heater cores may be assembled into a common case. Depending upon the location of the heater with respect to the evaporator, there are two air-mix temperature control designs, namely series air mix and parallel air mix. The series air mix utilizes the evaporator core upstream of the air supply and the heater core offset within the air flow such that all inlet air is directed through the evaporator core, and thereafter selectively directed through the heater core. When the compressor is turned on, the air is cooled and dehumidified. Otherwise, air passes unchanged through the evaporator. A blend door can divert a variable portion of the air through the heater core. These two air streams are then mixed and delivered to the air distribution system. In the parallel air mix system, separate evaporator and heater cores are located end-to-end. The evaporator and heater are in parallel air paths and the blend door varies the amount of air passing through each. At full cold setting, all air passes through the evaporator and none through the heater. At full hot setting, all air passes through the heater and none of the air passes through the evaporator. At intermediate settings, a portion of the air stream passes through the heater and evaporator.

An integrated heater-evaporator core can meet the functional requirements for both of the air mix systems described above. However, the present invention is particularly suitable for the parallel air mix since its geometry readily fits the available space in a wide range HVAC housings.

The above heat exchangers generally may be of the U-flow tube and fin type, such as disclosed in my U.S. Pat. No. 5,058,662 for TUBE END SUPPORT FOR U-CHANNEL EVAPORATORS assigned to the assignee of this application and hereby incorporated by reference, which discloses heat exchanger utilizing pairs of plates forming tube passes and tanks wherein a plurality of the tubes are layered or stacked with fin type air centers therebetween to form the heat exchanger. The pair of tanks are formed by interconnected drawn cups located at one end of the tubes and are interconnected by the U-channels thereof.

SUMMARY OF THE INVENTION

The invention integrates two heat exchangers, such as a heater core of the engine cooling system and an evaporator core of the air conditioning system for a motor vehicle, into a unitized heat exchanger having discrete compartments for heating and cooling in parallel flow and other air mix systems. The heat exchanging assembly comprises a plurality of pairs of elongated stamped plates extending between first and second ends secured together to form tube elements. First and second pairs of tanks drawn from plate material at opposite end of the tubes provide enlarged flow passages that extend longitudinally through the plurality of tubes which are in fluid communication with the U-flow section of the tube elements. A first of the pairs of tanks receives a first heat exchanger fluid and the second of the pairs of tanks receives a second heat exchanger fluid and is hydraulically isolated from the first heat exchanger fluid. Each of the tubes include a partition wall extending therethrough to isolate the first fluid flowing in the first pair of tanks in a first section from the second fluid flowing in the second pair of tanks in a second section. The tubes also include an elongated wall extending from the pairs of tanks towards the partition wall for providing U-shaped flow channels through each of the tubes and between each of the tanks forming the first and second sections. A plurality of corrugated fins provide air centers disposed between adjacent tubes for directing an air stream past the tube elements for effective heat transfer with the first and second fluids circulating in the tubes.

The invention also includes fin supporting and separating projection means extending outwardly from the formed tubes. A pair of isolated fins are disposed between each adjacent pairs of tubes between the tanks and the projection means so that one of the fins is only in effective heat transfer relationship with the first fluid and the other of the fins is only in effective heat transfer relationship with the second fluid to inhibit conductive heat transfer by the fins between the separate sections. The partition wall secures the formed tubes of the sections in a tandem or end to end relationship and includes apertures formed therethrough adjacent the projection means for interrupting heat transfer across the plates between the first and second fluids.

In one preferred embodiment, the heat exchanger assembly is utilized such that separate air streams pass through the heater and through the evaporator compartment of the exchanger and mix after discharge therefrom.

Other advantages of the present invention will be readily appreciated as the same becomes better understood by reference to the following detailed description when considered in connection with the accompanying description of the drawings in which:

BRIEF DESCRIPTION OF THE DRAWINGS

FIG. 1 is a diagrammatic top view of the heating, ventilating and air conditioning system for vehicle utilizing the subject invention;

DESCRIPTION OF THE PREFERRED EMBODIMENTS

Figures 2, 3:
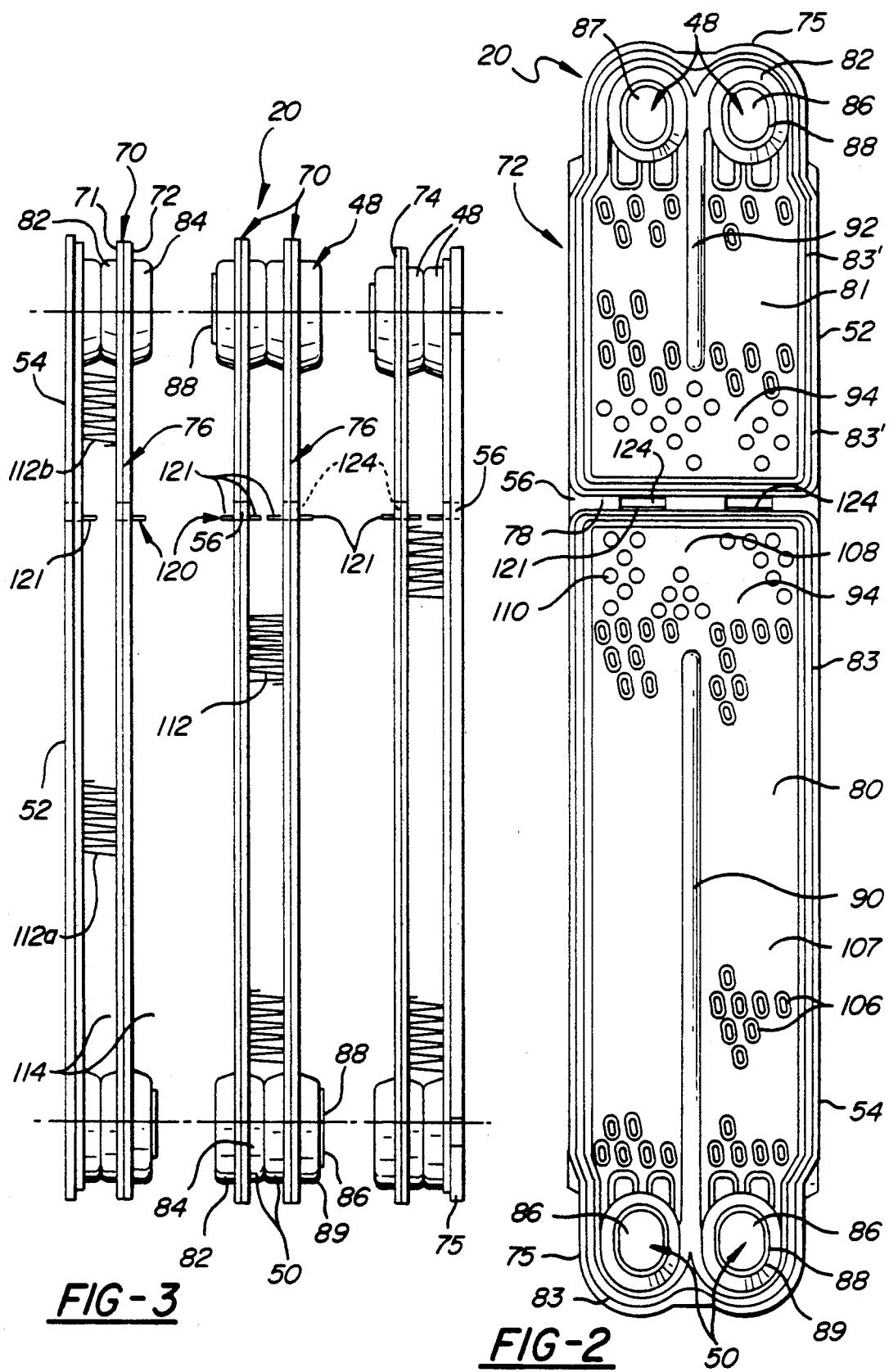
FIG. 2 is a plan view of the plates utilized in the heat exchanger of FIG. 1.
FIG. 3 is a side view of a portion of the integral heater-evaporator core of one embodiment of this invention with parts removed.

Referring to FIG. 1, there is diagrammatically illustrated a heating, ventilating and air conditioning (HVAC) system 10 for the passenger compartment of an automotive vehicle. The system generally includes a plurality of interfitting housing components of plastic, or other suitable material, which includes an air intake 12 through which air (flow arrow A) is supplied to an electrically powered rotary blower 14 operatively mounted in a blower housing 16.

The blower 14, driven by a brushless motor 18, forces air through a unitized passenger compartment heater and air conditioner evaporator core 20 immediately downstream of the blower 14 which is illustrative of only one embodiment and location of the invention. A cover 22 is removably secured to the housing 16 by threaded fasteners 23 to provide convenient access to the blower 14 for any service requirements.

The unitized heater and evaporator core 20 is mounted within a housing section 26 which is integrated with the blower housing. A cover 28 is removably secured to one side of this housing 26 by threaded fasteners 29 to provide service access to the heater and evaporator core 20.

Operatively mounted in the housing section 26 downstream of the heater and evaporator core 20 is a rotary valve assembly 30 which provides selective control of the direction and flow volume of the air stream in the HVAC system. The rotary valve 30 has ports 32, 34 which are controlled by the positioning of a port closure member through the manual or automatic turning operation of a sector gear or other actuator component, not shown, to control the position of the closure member and the air flow to the outlets 40, 42, 44 which can be for the passenger, driver and windscreen defrost respectively.

The heater and evaporator core 20 provides integrated but heat isolated heater and air conditioner evaporator sections 52, 54 in a tandem or end to end relationship. The core 20 has two pairs of tanks 48, 50, each of which are directed to and associated with the separate heater and evaporator sections 52, 54. An internal partition wall 56 separates the unitized heater and evaporator core 20 into the heater section 52 and evaporator section 54. The tanks 48 of the heater section 52 are operatively connected by conduits 58, 59 to the radiator 60 of a coolant system for a liquid cooled engine, and the tanks 50 of the evaporator section 54 are connected by conduits 62, 63 to the condenser and to the accumulator and compressor of the automotive air conditioning system.

A blend door 64 is pivotally connected adjacent the core 20 at the partition 56 to selectively be positioned to direct the inlet air stream to either the heater section 52 or evaporator section 54, or to a combination of the section 52, 54. The blend door 64 is operatively controlled by a temperature control mechanism responsive to the passenger temperature selection.

FIG. 1 illustrates a parallel air-mix system wherein the intake air that flows through both of the heater sections 52 and evaporator section 54 is in parallel so that when the door 64 is in a blend position, a single air stream is split and directed in parallel across both the heater and evaporator and is combined for distribution thereafter.

Figure 4:
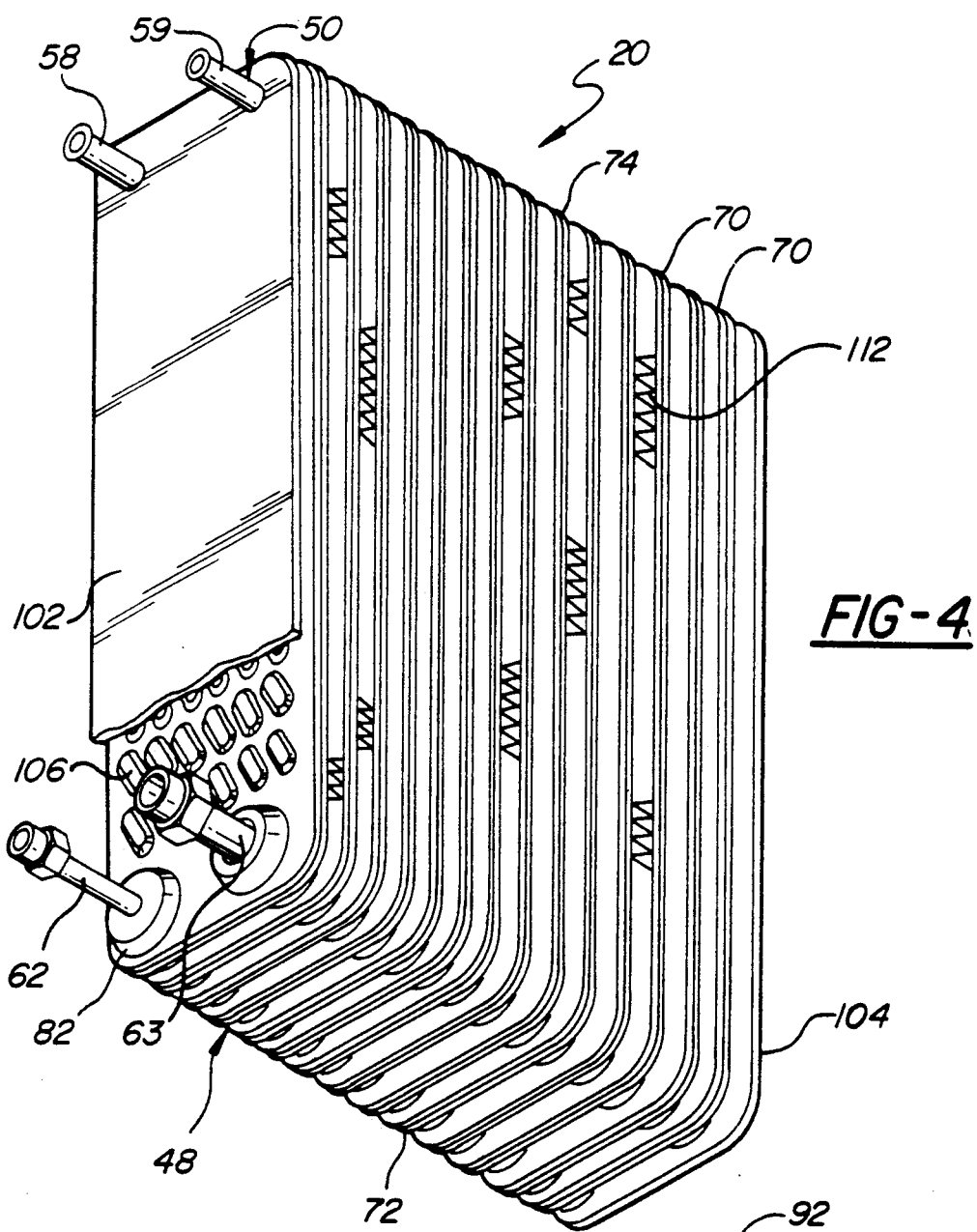
FIG. 4 is a pictorial view of the heat exchanger of FIG. 3 with parts broken away.

The heater and evaporator core 20 is more specifically illustrated in FIGS. 2–4. The heater and evaporator core 20 comprises a plurality of pairs 70 of elongated identical plates 71, 72 to form U-flow tubes 76 spaced from one another. Each plate 71, 72 extends vertically between first and second ends 74, 75. Each pair 70 of plates 71, 72 forms the U-flow tubes 76 that extend between the first and second ends 74, 75. The plates 71, 72 also have pairs of drawn cups at opposite ends to form the pair of tanks 48, 50 at the first and second ends 74, 75. The pairs of tanks 48, 50 extend longitudinally forming the upper and lower ends of the stacked tubes 76 and are in fluid communication with the U-flow section in each of the corresponding tubes 76.

A first 48 of the pairs of tanks is formed at the first or upper end 74 of the core and communicates a first fluid, i.e., engine coolant, and a second of the pairs of tanks 50 is formed at the second or lower end 75 of the core and communicates a second fluid, i.e., air conditioner refrigerant.

Each of the pairs 70 of plates 71, 72 includes the integral partition wall 56 extending therethrough to mechanically connect the sections 52 and 54 and has lanced openings therein to isolate the engine coolant and air conditioner refrigerant thereby separating the core 20 into the discrete heater section 52 and evaporator section 54.

The plates 71, 72 are joined in face-to-face relationship with each other having recessed portions 80, 81 forming U-flow passages of each tubes 76 within each section 52, 54. The periphery of the plates 71, 72 include a perimeter rib 83, 83' projecting therefrom to contact each other to seal the fluid therebetween. The pairs of tanks 48, 50 are formed by enlarged bulged portions 82, 84 in opposite ends 74, 75 of the plates, 71, 72 and include enlarged fluid flow apertures 86 formed in the centers 89 thereof. The drawn or bulged portions 82, 84 of adjacent pairs 70 of plates 71, 72 mate and are sealed with each other about the apertures 86 to form a continuous longitudinal tank which extends through all of the layers and stacks of pairs 70 of plates 71, 72. One of each of the mating bulged portions 82, 84 includes a peripheral flange 88 extending outwardly about the aperture 86 for engagement into and securement with the aperture 86 of the mating bulged portion 82, 84 for alignment thereof.

Figure 5:
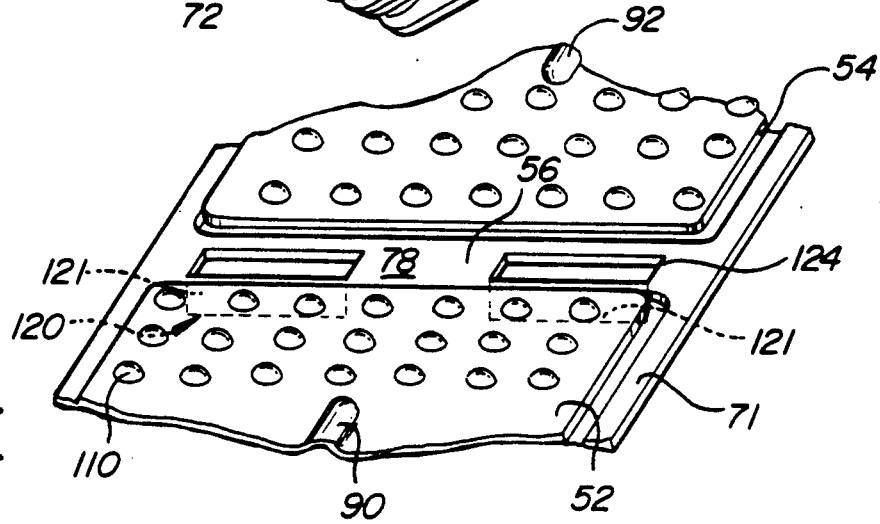
FIG. 5 is an enlarged fragmentary view of the partition of a plate of FIG. 2 showing one arrangement of the partition connecting the heater and evaporator sections thereof.

As best illustrated in FIGS. 2 and 5, the plates 71, 72 include a pair of longitudinal ribs 90, 92 spaced from the periphery rib 83, 83' between the respective pairs of tanks 48, 50 toward the partition wall 56 providing a fluid crossover 94 between the end of the rib 90, 92 and the peripheral ribs 83' or 83 for providing a U-shaped flow channel through each of the pairs 70 of plates 71, 72 and in communication respectively with each of the pairs of tanks 48, 50. When the two plates 71, 72 are assembled and joined together to form a tube, the longitudinal ribs 90, 92 on the pairs 70 are brought into abutment with one another thereby forming a wall and U-channel within the tube elements 76. The outermost stamped plates 102, 104 of the core 20 are flat and may be brazed to an inner plate 72 to form a half tube construction.

The plates 71, 72 forming the tube elements 76 include a number of bumps or projections 106 extending inwardly into the flow path. The projections 106 have an oval shape and are angularly disposed through the elongated passages or arms 107 of the U-flow channel. At the crossover 94 of the U-flow channel, circular indentations 110 or projections are formed.

Air center means 112 are connected between adjacent tubes 76, for directing air from an inlet side of the core 20 and over the heater section 52 and the evaporator section 54 as determined by the position of blend door 64 to increase the heat exchange efficiency of the discrete core sections. The air center means 112 are generally sinusoidally shaped sheet metal fins connected between the tubes 76. The mating bulged portions 82, 84 between pairs 70 provide a suitable gap 114 for accommodating the air centers 112 therebetween.

The partition wall 56 includes projection means 120 extending therefrom into the gap 114. In the preferred embodiment, the projection means 120 is an isolating support tab 121 for supporting and separating the air center fins 112 of the heater and evaporator sections. The projection means are formed by lancing to leave openings 124 which diminish the area between the sections for transfer of heat energy by conduction between the sections.

Two isolated fins 112a, 112b are brazed between each of the adjacent tubes 76 and between bulged tank portions 82, 84 and the support wall so that one of the fins 112a is in conductive heat exchange with the heater section 52 and first fluid and the other of the fins 112b is in conductive heat exchange with the evaporator section 54 and second fluid.

As illustrated in FIG. 5, the support wall 121 may be formed by cutting three sides into the partition wall 56 forming tabs, and bending the tabs 121 outwardly from each plate 71, 72. The bent tabs 121 are used to support and retain the air center fins 112, and serve as a thermal effective divider between the evaporator air center fin 112b and heater air center fin 112a. The tabs 121 are important because the fin heat constant is different for both compartments. Two tabs 121 are formed extending transverse through the plates 71, 72 aligned with each channel. Apertures 124 formed when the tabs 121 are struck to inhibit heat conduction between the sections 52, 54.

Figure 6:
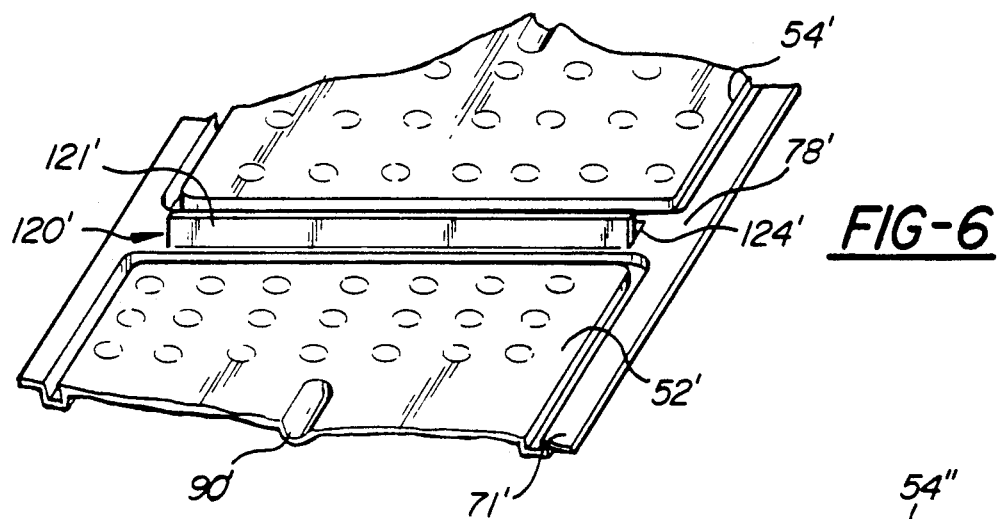
FIGS. 6–8 are fragmentary views showing alternative designs of the partition.
Figure 7:
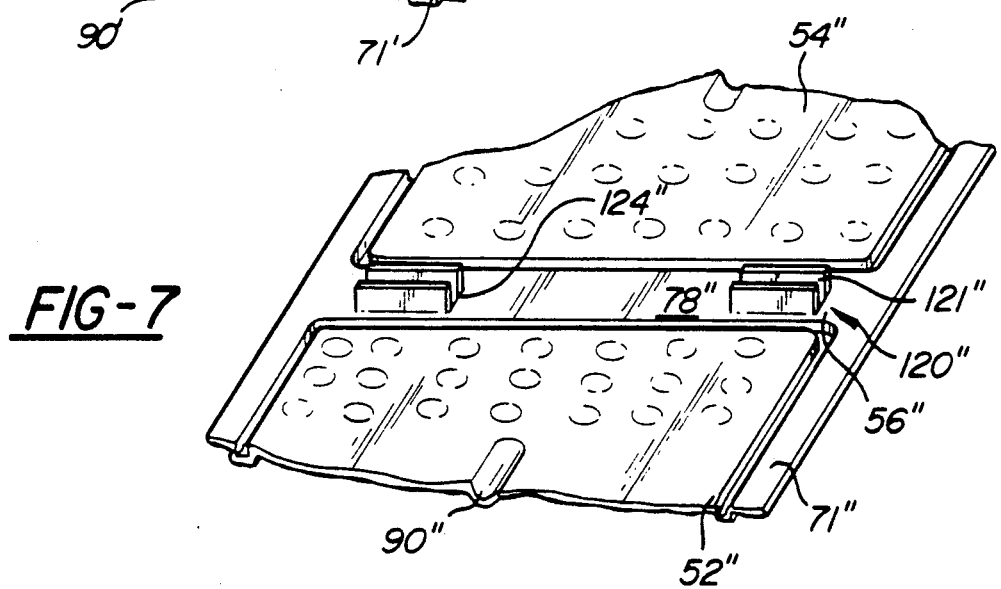
Figure 8:
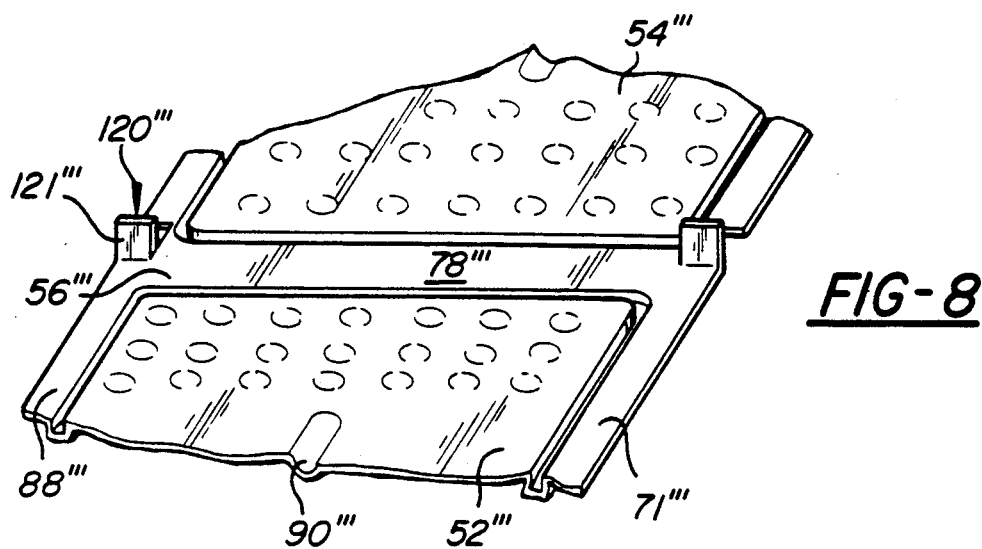

FIGS. 6-8 illustrate alternative embodiments of the portion wall and the air center supporting projection means.

As illustrated in FIG. 6, a single elongated tab 121' is formed by cutting three sides in the partition wall 56 and bending and deforming same as in the first embodiment. The single tab 121' extends the transverse width of the channels 52, 54.

As illustrated in FIG. 7, four tabs 121" are formed by cutting two H-shapes into the surfaces 78" and deforming two tabs 121" for each cut shape. In this embodiment, the fins 112" are connected to each section 52", 54" and will be spaced apart and supported by spaced tabs 121".

As illustrated in FIG. 8, pair of tabs 121''' are formed by cutting a slit in the partition wall 56 and deforming the tabs 121''' therefrom.

It is to be understood that the shape of the core 20 may be varied to accommodate installment requirements. For example, the evaporator section 54 may be configured narrower than the heater section 52, i.e., the width of the U-channel and plate section of the evaporator section 54 is less than the physical width of the heater section 52. The evaporator part can have a much larger size than the heater part. Preferably, the integral core can be installed in such a way that the heater tank is at the top and the evaporator tank is at the bottom for better condensate drainage through drain tube T.

Also included is a method of making the unitized heater and evaporator core 20. The method includes the steps of: stamping a plurality of plates forming end to end heater and evaporator sections with a partition wall or web separating the sections and with a longitudinal rib extending a portion of each section providing a U-channel therethrough forming bulged portions at each end of the plate with apertures therethrough providing tanks; sealing pairs of plates to one another with the partition and longitudinal rib contacting each other; stacking a plurality of pairs of plates forming tubes with the bulged portions thereof in mating and sealing connection with each other thereby forming pairs of tanks through the stacked tubes with gaps formed between adjacent tubes; lancing and forming tabs in the partition wall or webs extending into the gap to thereby form heat blocks and air center supports; installing isolated air center fins between the tanks and tabs, building a core from a predetermined number of said plates and air centers, strapping or otherwise securing said built up core by a load applied thereto brazing said core in an oven to provide the unitized dual heat exchanger.

After the heat exchanger has been brazed, it is ready for operative connection to the separate heat controlling systems described above.

While the invention has been described in an illustrative manner, it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A unitized heat exchanging assembly comprising:
a plurality of pairs of elongated plates extending between first and second ends forming tube pass elements between said plates and said first and second ends and forming a pair of tanks at each of said first and second ends extending longitudinally through said plurality of pairs of plates and in fluid communication with said tube pass elements, a first of said pairs of tanks receiving a first fluid and a second of said pairs of tanks receiving a second fluid;
said pairs of plates each including longitudinal ribs extending from said pairs of tanks in said tube pass elements for providing flow channels through each of said pairs of plates; and including a partition wall extending through said plates transverse to said longitudinal ribs with the ends of the ribs spaced from said partition wall to isolate said first fluid flowing in said first pair of tanks from said second fluid flowing in said second pair of tanks and for forming a pair of U-channel through said pairs of plates each associated with one of said pairs of tanks.

2. A unitized heat exchanging assembly comprising:
a plurality of pairs of elongated stamped plates extending between first and second ends forming tube pass elements between said plates and said first and second ends and forming a pair of tanks at each of said first and second ends extending longitudinally through said plurality of pairs of plates and in fluid communication with said tube pass elements, a first of said pairs of tanks receiving a first fluid and a second of said pairs of tanks receiving a second fluid;
said pairs of plates each including longitudinal ribs extending from said pairs of tanks in said tube pass elements for providing flow channels through each of said pairs of plates; and including a partition wall extending through said plates transverse to said longitudinal ribs with the ends of the ribs spaced from said partition wall to isolate said first fluid flowing in said first pair of tanks from said second fluid flowing in said second pair of tanks and for forming a pair of U-channel through said pairs of plates each associated with one of said pairs of tanks;
each of said plates include a projection wall extending from said partition wall;
a plurality of corrugated fins disposed between adjacent pairs of plates for directing an air stream through the tube elements in conductive heat transfer with the first and second fluids; said plurality of fins including a pair of isolated fins between each adjacent pairs of plates connected between said tanks and said projection wall so that one of said fins is in conductive heat exchange with said first fluid and the other of said fins is in conductive heat exchange with said second fluid.

3. A heat exchanging assembly comprising:
a plurality of pairs of elongated stamped plates extending between first and second ends forming tube pass elements between said plates and said first and second ends and forming a pair of tanks at each of said first and second ends extending longitudinally through said plurality of pairs of plates and in fluid communication with said tube pass elements, a first of said pairs of tanks receiving a first fluid and a second of said pairs of tanks receiving a second fluid;
said pairs of plates each including longitudinal ribs extending from said pairs of tanks in said tube pass elements for providing flow channels through each of said pairs of plates; and including a partition wall extending through said plates transverse to said longitudinal ribs with the ends of the ribs spaced from said partition wall to isolate said first fluid flowing in said first pair of tanks from said second fluid flowing in said second pair of tanks and for forming a pair of U-channel through said pairs of plates each associated with one of said pairs of tanks;
each of said plates include projection means extending therefrom at said partition wall outwardly from said formed tube elements;
a plurality of corrugated fins disposed between adjacent pairs of plates for directing an air stream through the tube elements in conductive heat transfer with the first and second fluids;
and said partition wall including apertures therethrough adjacent said projection means for interrupting heat transfer across said plates between said first and second fluids;
said plurality of fins including a pair of isolated fins between each adjacent pairs of plates connected between said tanks and said projection means so that one of said fins is in conductive heat exchange with said first fluid and the other of said fins is in conductive heat exchange with said second fluid.

* * * * *